United States Patent [19]

Lanan

[11] Patent Number: 5,011,333

[45] Date of Patent: Apr. 30, 1991

[54] UNDERWATER PIPE LAYING APPARATUS

[75] Inventor: Glenn A. Lanan, Houston, Tex.

[73] Assignee: Intec Engineering, Inc., Houston, Tex.

[21] Appl. No.: 547,294

[22] Filed: Jul. 3, 1990

[51] Int. Cl.⁵ ............................ F16L 1/14; B63B 35/03
[52] U.S. Cl. .................................... 405/166; 405/168; 405/173
[58] Field of Search ............... 405/158, 164, 165, 166, 405/168, 173, 177; 72/161

[56] References Cited

U.S. PATENT DOCUMENTS

| | | | |
|---|---|---|---|
| 3,641,778 | 2/1972 | Gibson | 405/168 |
| 3,685,306 | 8/1972 | Mott | 405/168 |
| 3,822,559 | 7/1974 | Matthews et al. | 405/166 |
| 4,243,345 | 1/1981 | Cha et al. | 405/168 |
| 4,340,322 | 7/1982 | Springett et al. | 405/168 |
| 4,410,297 | 10/1983 | Lynch | 405/164 |
| 4,820,082 | 4/1989 | Recalde | 405/168 |

Primary Examiner—David H. Corbin
Attorney, Agent, or Firm—Jackson & Walker

[57] ABSTRACT

Vessel carried apparatus for laying a continuous metal pipe on the bottom of a body of water comprising a pipe overbending structure mounted on the end of a vessel and having a 90 degree arcuate peripheral configuration in a vertical plane extending from the water to a position overlying the vessel. Pipe engagable rollers are disposed along the arcuate periphery of the overbending structure, and an arcuate track parallel to the arcuate periphery is formed on the overbending structure. A stinger frame carries two longitudinally spaced pipe bending roller means respectively engaging the top and bottom surfaces of a continuous linear pipe formed on the vessel. The first such roller means bends the pipe to conform to a selected extent of the pipe engagable rollers, while the second roller means reversely bends the pipe to a linear configuration. The forward end of the stinger frame is horizontally pivoted to a carriage which is lockable in any selected position along the arcuate track. The rear portions of the stinger may be supported by a gantry mounted cable. The position of the stinger frame along the arcuate track determines the entry angle of the pipe into the water.

20 Claims, 6 Drawing Sheets

UNDERWATER PIPE LAYING APPARATUS

BACKGROUND OF THE INVENTION

1. FIELD OF THE INVENTION

This invention relates to the laying of a continuous pipe line along the floor of a body of water. More particularly, the invention is directed to the laying of the pipe line along such a floor from a floating vessel disposed on the surface of the body of water.

2. SUMMARY OF PRIOR ART

When laying a pipeline along the floor of a deep body of water, the problem of avoiding excessive pipeline bending or buckling while staying within the stress and strain limits of the pipeline is ever present and difficult to overcome. This problem results from the fact that very long continuous lengths of pipeline, typically ranging in hundreds of feet, must be lowered from the surface of the body of water to the floor thereof and that controlled movement of such length is very difficult.

Special purpose pipeline barges or other floating vessels are employed to lay underwater pipelines along the floor of the body of water. A typical pipe laying operation involves assembling the pipeline by coupling successive sections of pipe on the barge or vessel and then moving the barge or vessel ahead as the assembled pipeline is payed out and laid onto the ocean floor. Alternatively, the pipeline may be preassembled and wound onto a rotatable reel which has been mounted on the barge or vessel. The pipeline is then spooled off the reel, straightened, and laid onto the ocean floor after the barge or vessel arrives at the proper field location.

Any pipeline is capable of withstanding some bending but such bending must stay within predetermined limits to avoid permanently deforming (buckling), fatiguing or fracturing the pipeline. As the pipeline is laid from a conventional pipe lay vessel, the pipeline exits the vessel and follows a more or less S-shaped configuration from the vessel deck to the ocean floor. In relatively shallow waters, the vertical descent of the unsupported pipeline, being small, allows use of a large radius of curvature of the pipeline as it comes off the vessel, and the pipe remains safe from bending damage. However, as the water depth increases, the length of the unsupported pipeline increases, causing the pipeline to sag under its own weight unless it is supported by increased tension applied to the pipe. Thus the length of the pipeline overbend support structure on the barge becomes greater and the bending moments imposed on the pipeline may well exceed the elastic limits of the pipe and result in permanent deformation of the pipeline.

U.S. Pat. No. #3,641,778 to COX et al attacks this problem by teaching that a predetermined degree of tension must be maintained in the pipeline during the pipe laying operation. Such tension would aid in eliminating excessive bending and fatiguing of the pipeline during the pipe laying operation, particularly if high wave or current conditions exist in the body of water. At the time of filing of the aforementioned COX et al patent, it was uniformly considered undesirable in the art to permit the bending stresses in the continuous pipe being laid to exceed the elastic limit of the pipe. Hence, the angle of the pipe as it came off the pipe laying vessel was still very modest and resulted in only an elastic deformation of the continuous pipeline.

Some few years later, U.S. Pat. No. #3,641,778 to GIBSON proposed that the continuous pipe being laid be subject to a non-elastic deformation as it came off the vessel and then to a reverse non-elastic deformation to restore the pipeline to a linear configuration before it entered the water. This concept obviously permitted the utilization of much smaller radius of curvature of the pipeline as it was bent from an essentially horizontal configuration to a desired angular configuration to enter the water. This eliminated the necessity for excessively long lengths of stingers or pipe supporting elements projecting rearwardly behind and below the vessel in order to provide sufficient support to the continuous pipe as it was coming off the vessel to prevent the occurrence of excessive non-elastic deformations.

Still another approach utilizing elastic deformation of the continuous pipe being laid in a body of water from a vessel is found in U.S. Pat. No. #3,822,559 to MATTHEWS, JR. et al. In this patent an arcuately curved stinger is provided having pipe engaging rollers disposed along its arcuate periphery. The pipe is held in engagement with the rollers by a fixed roller secured to the outboard end of the stinger. The entry angle of the pipeline is determined by advancing the stinger along an arcuate path toward or away from the water by a rack and pinion arrangement. This arrangement provided an entry angle of the pipe ranging from 15° for very shallow water to 60° or more for deep water. It had the disadvantage that a single roller element was utilized both to hold the continuous pipe into engagement with the arcuately disposed rollers and to effect the straightening of the continuous pipe prior to its entry into the water. The position of this single roller element can not be easily raised or lowered to allow passage of valves, or other pipeline appurtenances often installed as part of a pipeline.

The MATTHEWS, JR. et al structure provided no convenient arrangements for recovery and reattachment of the end of a previously laid section of the pipeline to the pipe to be laid, which is an important factor in the laying of pipelines, since the entire pipeline often cannot be laid in a single continuous operation. The pipeline is laid until the a storm comes up, making further pipeline operations impractical. The end of the line is then capped and lowered to the ocean floor and its position marked with a buoy. It is therefore necessary, when resuming the pipe laying operation, to pull the end of the previously laid pipeline back onto the vessel by the buoy cable and extend it through the pipe bending apparatus to a position where the next length of pipe may be welded to the recaptured end. An effective pipe laying apparatus should provide a convenient apparatus for rebending the free end of the recaptured pipe to permit the resumption of the pipe laying operation.

Another disadvantage of the MATTHEWS, JR. et al structure is the fact that the greater the departure angle, the greater is the extension of the entire stinger apparatus into the water behind the vessel. This acts as a deterrent when the vessel is subject to transverse waves or current, or operated in deep water. When such a stinger apparatus which is capable of a large departure angle is retracted for use in shallow water, it would also extend within the vessel to such a degree that it may protrude through the vessel's bottom.

It should further be mentioned that the laying of pipelines can also be accomplished through the use of a vertical tower on the vessel by which successive lengths of the pipeline were assembled and the resultant continuous pipeline is then fed vertically downwardly out of the vessel and engaged a support structure extending from the bottom of the vessel to impart the desired angle of entry relative to the water. In this case, the problems associated with long pipeline support structures beneath the vessel are experienced when the vessel is intended to lay pipe into shallow water depths. Increased support structure lengths are required to guide the pipeline from its vertical make-up position to its final horizontal position on the seabed. Obviously, these forms of vertical entry support structures can present severe problems when the vessel attempts to return to dock in that a very substantial docking depth of water may be required to accommodate the extruding pipeline guiding structure. Hence, such depending structures had to be made movable relative to the vessel in order to be withdrawn upwardly to a position where they did not project below the keel of the vessel. A further limitation of such vertical pipe make-up systems is that they provide substantially less work space for assembling the pipeline than on the horizontal deck of a conventional pipeline lay barge.

It follows that there is definite room for improvement in pipe laying and recovering apparatus for use on pipe laying vessels.

SUMMARY OF THE INVENTION

The invention provides a pipe laying apparatus which may be conveniently mounted on existing pipe laying barges or vessels. It is assumed that the pipe laying barge or vessel is provided with a pipe storage area for discrete lengths of pipe, together with pipe handling apparatus for successively moving the pipe lengths into longitudinal alignment and apparatus to effect the welding thereof to form a continuous pipe which extends toward one end, generally the rear end, of the pipe laying vessel. If the pipe to be laid is carried on the vessel in the form of coils on a reel, a conventional pipe straightening apparatus is provided to effect the straightening of the pipe after it comes off the coil, permitting the delivery of the pipe to the pipe laying apparatus in a substantially linear, stress free condition.

A pipe laying apparatus embodying this invention comprises an overbending structure which has an arcuate periphery in a vertical plane of approximately 90 degree extent. Such structure is fixedly mounted adjacent one end of the vessel and has an arcuate periphery in a vertical plane extending from a position overlying the vessel and aligned with the delivery position of the continuous pipe produced on the vessel to the water surface, or slightly below the water surface, immediately adjacent the end of the vessel.

The overbending structure is provided along its arcuate periphery with a plurality of horizontal pipe supporting rollers disposed in side by side relationship. Alternatively, a movable roller track could be employed. A positioning roller s disposed intermediate the pipe bending apparatus and the delivery point of the continuous pipe and engages the top surface of the continuous pipe to direct it toward the arcuate pipe supporting rollers. This roller also prevents an upward deflection of the pipe from its linear path entering the pipe bending apparatus due to stresses applied to the pipe by the bending apparatus.

The overbending structure is additionally provided with an arcuate track which is perpendicular to the axes of the pipe supporting rollers. A carriage is movably mounted in such track and such carriage provides horizontal pivotal support for a stinger frame which straddles the overbending roller frame.

The stinger frame mounts a pair of pipe engaging roller or track units (hereinafter called roller means) which are longitudinally spaced and which respectively engage the top and bottom surfaces of the pipe. The forward pipe engaging rollers or tracks engage the top surface of the pipe and urge the pipe into conforming relationship with the supporting rollers or track provided in the overbending structure. The rearward roller or track engages the under surface of the pipe and in conjunction with the other rollers effects the straightening of the pipe into a linear configuration prior to or immediately adjacent to the entrance of the pipe into the water.

The position of the support carriages for the stinger structure along the arcuate track determines the arcuate extent of the pipe supporting rollers or track which is engaged by the pipe, hence determines the angle of entry of the pipe with respect to the sea surface. Preferably, the deformation of the pipeline exceeds the elastic limit of the pipe material and results in a plastic deformation of the pipe. This greatly diminishes the radius of the curvature of the pipe supporting rollers or track in the overbending structure and permits the end of the overbending structure to be positioned closely adjacent to the end of the vessel. Entry angles ranging from a fraction of 1 degree to slightly more than 90 degrees are readily possible with the apparatus of this invention.

The rear end of the stinger is vertically supported by a cable which in turn is entrained over a support pulley mounted on a horizontally extending gantry beam. The cable assists in reducing pipe deformation or fatigue due to pitch or heave of the vessel.

A further feature of the apparatus of this invention is the convenience of recapturing the free end of a previously laid pipeline. A clamp element having an inverted U-shaped configuration is provided which has roller carriages mounted in the same tracks as the carriages for the stinger. Such clamp engages the top surface of the free end of the pipe as it is pulled toward the vessel by an abandonment/recovery cable and passed between the two roller means on the stinger frame. One or both of the roller means may be powered to assist the forward movement of the recovered pipe end. The clamp and the pipe are then moved forward concurrently, thus forcing the free end of the pipe to plastically bend to conform to the arcuately arranged supporting rollers or track provided on the arcuate periphery of the overbending structure. Thus, the free end of the recaptured pipe may be readily bent to a substantially horizontal position so it can be conveniently welded with the end of the next length of continuous pipe. The pipe retrieval clamp can be removed by passing the supporting rollers of the clamp element out of the inward end of the track and the pipe laying operation can be immediately resumed.

Further advantages of the invention will be readily apparent to those skilled in the art from the following detailed description, taken in conjunction with the annexed sheets of drawings, on which is shown a preferred embodiment of the invention.

DESCRIPTION OF PREFERRED EMBODIMENT

Figure 1:
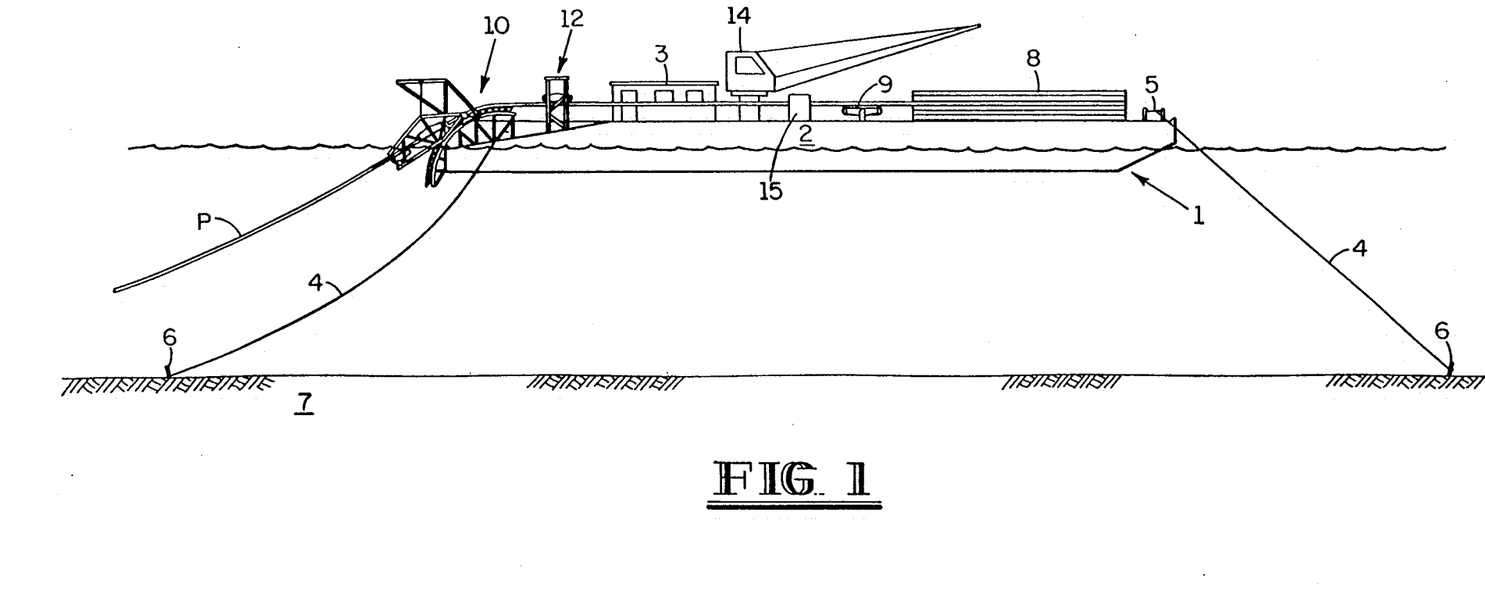
FIG. 1 is a schematic view of a pipe laying vessel incorporating the pipe laying apparatus of this invention.

FIG. 1 of the drawings schematically depicts a vessel 1, here shown as a barge, positioned at an offshore pipeline construction site during the laying of an underwater pipeline. The barge 1 includes an elongated hull 2 containing a hold in which supplies, fuel and equipment may be stored. A superstructure 3 including control equipment and the like is positioned on the deck of the barge. The barge shown is held in position by bow and stern mooring lines 4 extending from winches 5 on the deck to anchors 6 embedded in the ocean floor 7. The barge may be propelled along the pipeline route by taking in line at the bow, releasing line at the stern, and shifting the anchors as necessary.

In lieu of this, the barge 1 may be provided with a propulsion system which is not shown in the drawings. Such system will normally include a propeller at the stern of the vessel for providing forward thrust and two or more laterally directed propellers near the bow and stern for maintaining the desired heading or changing the lateral position of the barge as necessary. These "side thrusters" may be operated selectively to permit precise control of the vessel's position under various wind, wave and current conditions.

Figure 2A:
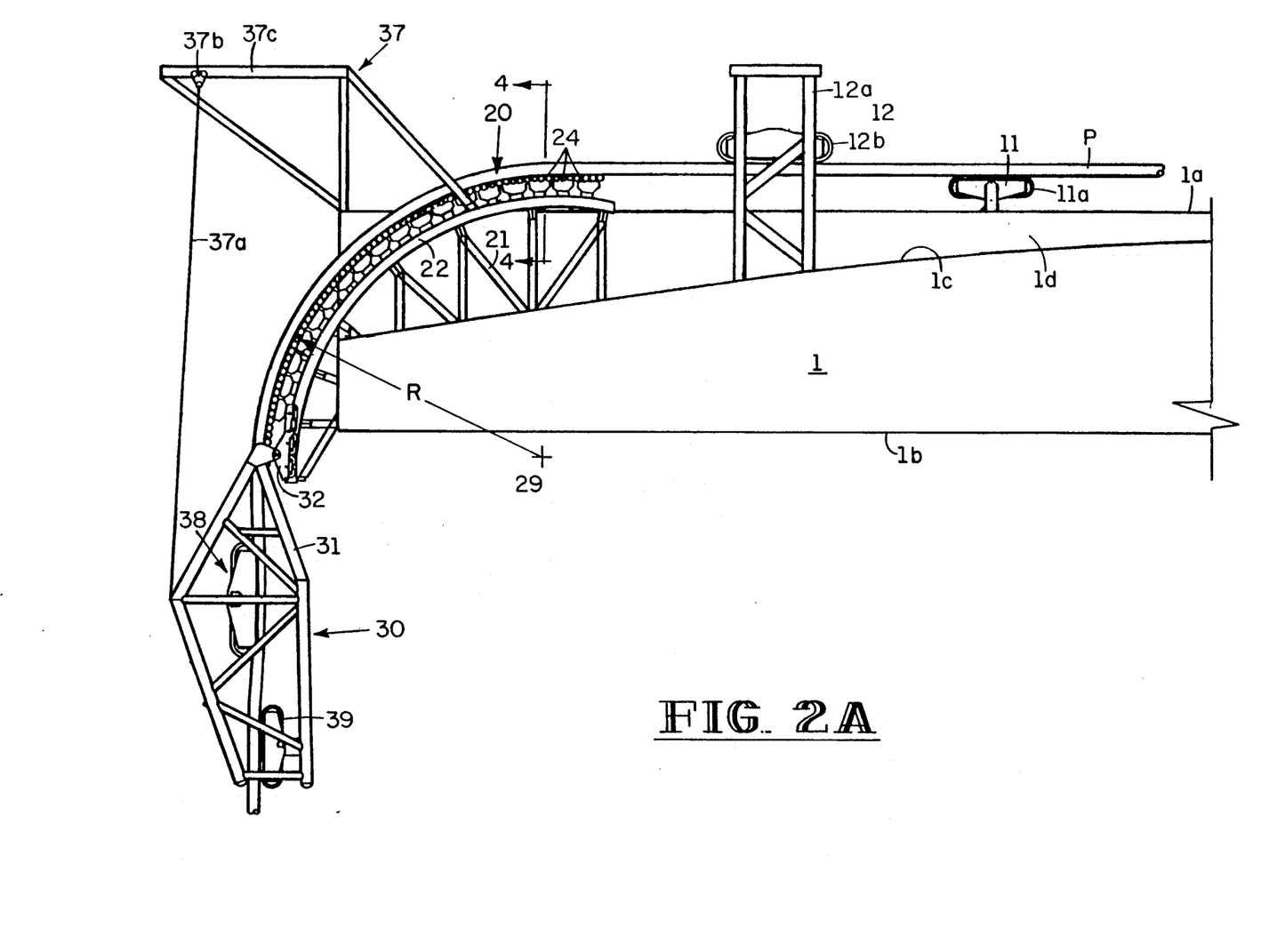
FIG. 2A is an enlarged scale schematic view of the pipe laying apparatus embodying this invention shown with the stinger positioned to produce a substantially 90° entry angle of the continuous pipe into the body of water.

The barge shown also includes storage racks 8, a pipe make-up ramp 9 on which sections of pipe are aligned and connected together, a crane 14 for handling the pipe sections, a pipe tensioning device 15 for engaging the connected pipe and resisting its movement to the rear of the barge. Alternatively, a large reel carrying a continuous coiled pipe may be utilized, followed by conventional pipe straighteners, to produce a continuous pipe of linear configuration extending toward the rear of the barge 1. The continuous pipe P is fed through a pipe bending apparatus 10 embodying this invention and discharged over the rear of the vessel at any selected angle relative to the horizontal. In FIG. 2A, discharge at an angle of about 90 degrees to the horizontal is shown, while in FIG. 2B, discharge at an angle approximating 30 degrees to the horizontal is shown.

Figure 2B:
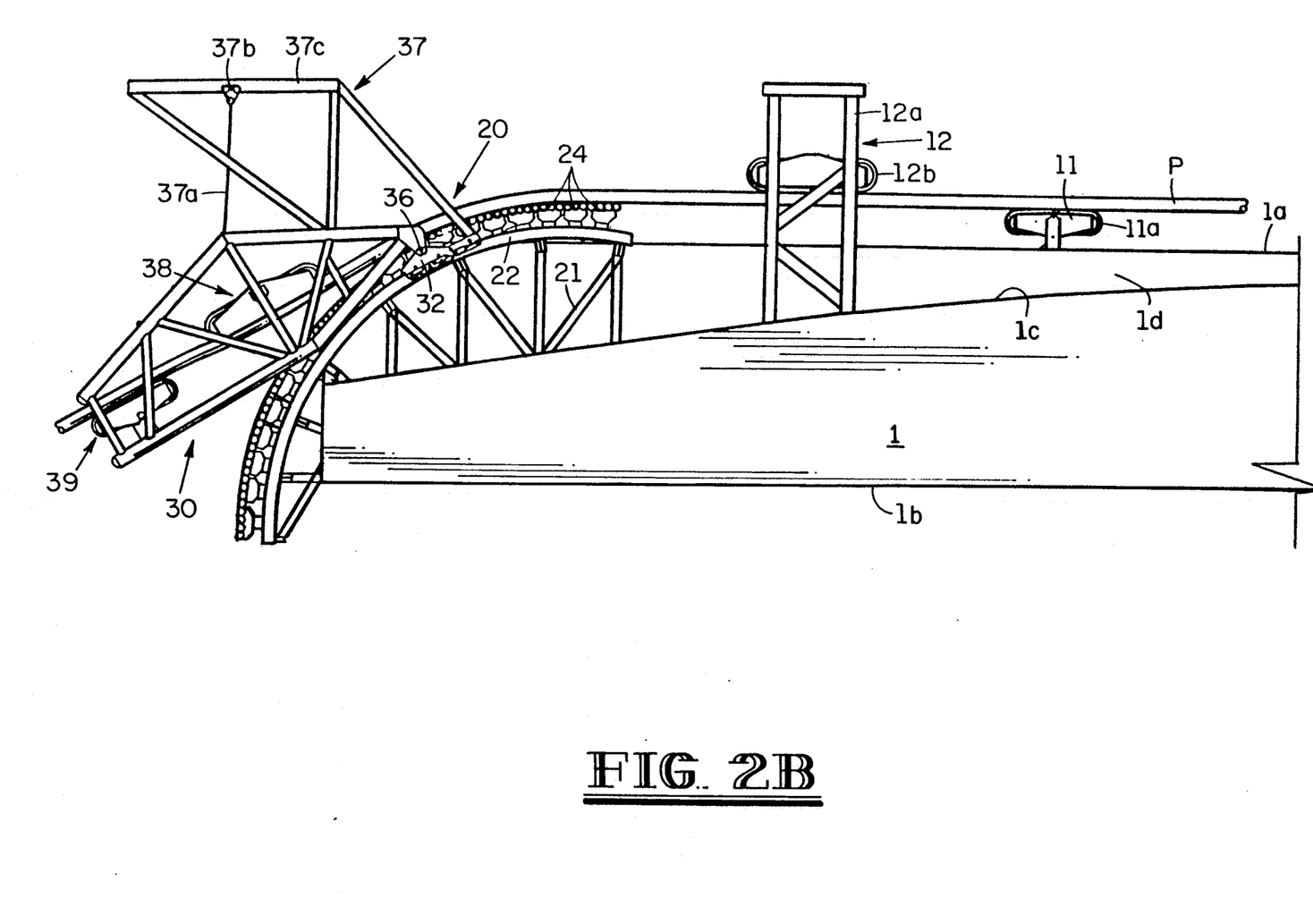
FIG. 2B is a figure similar to FIG. 2A but illustrating the position of the stinger required to produce a substantially 30° entry of the continuous pipe into the body of water.

Referring now to FIGS. 2A or 2B, the barge 1 is only schematically shown but, as is conventional, includes a barge deck 1a for supporting the pipe assembling equipment, a barge keel 1b and a pipe ramp 1c defined in a central o side recess 1d extending from the rear of the barge 1 to a medial portion of the barge. The apparatus 10 embodying this invention comprises a support roller means 11 for providing vertical support to the continuous pipe P assembled in the pipe assembly section of the barge 1. While the support roller means 11 has been generically defined as a "roller means", it preferably comprises a movable endless track 11a, the detaied construction of which will be hereinafter described.

Rearwardly of the support roller means 11, a positioning roller means 12 is provided which is vertically adjustably mounted on an upright support frame 12a suitably mounted in the pipe ramp recess 1d. Preferably the support roller means 12 comprises an endless movable track 12b which is similar to the track to be hereinafter described in detail in connection with FIG. 8. Such track is vertically adjustable by conventional hydraulically operated screw jacks (not shown).

Figure 3:
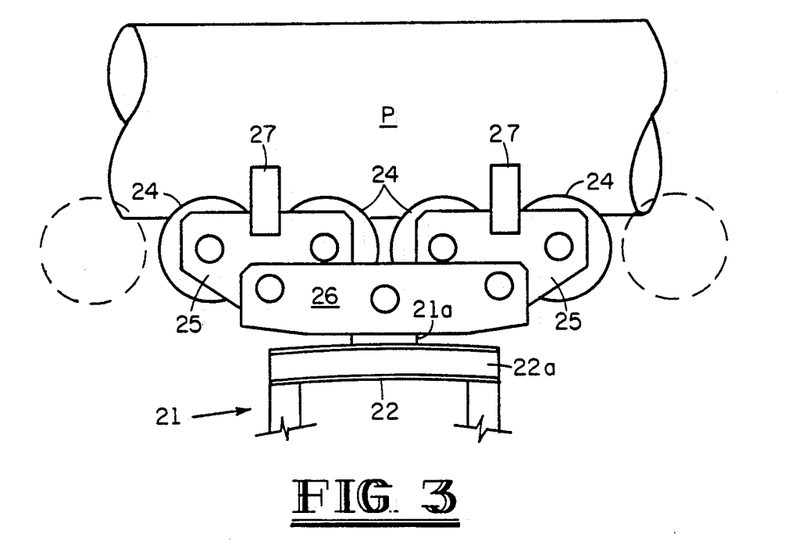
FIG. 3 is an enlarged scale, side elevational view of a portion of the pipe supporting rollers mounted on the arcuate periphery of the overbending structure.
Figure 4:
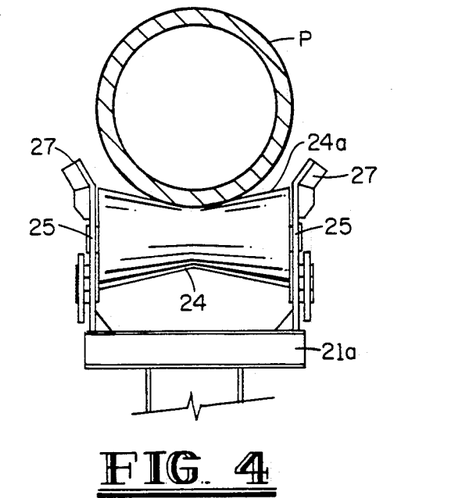
FIG. 4 is an enlarged scale sectional view taken on the plane 4—4 of FIG. 2A.

At the rear end of the barge 1, an overbending structure 20 is provided comprising a roller support frame 21 which is suitably mounted within the pipe ramp recess 1d of the barge 1 and a portion of which may be secured to the stern of the barge 1. Said frame structure has an arcuate periphery in a vertical plane defined by a pair of laterally spaced, curved beams 22, preferably I-beams, which define arcuate tracks 22b (FIG. 10) on both sides of the web portion 22a of the I-beam. A plurality of transverse beams 23 are welded between the arcuate I-beams 22 and the transverse beams 23 provide a mounting for a plurality of overbending rollers 24. Rollers 24 have concave surfaces 24a to maintain the pipe in a central position to accommodate variations in pipe size and allow passage of piepline abandonment/ recovery cables. Such abandonment/recovery cable passage is further aided by cable guides 27 provided to prevent cables from accidentally coming off the rollers and becoming entangled. Rollers 24 are disposed in side by side relationship and are horizontally rotatably journalled in subframes 25 (FIG. 3), each of which is horizontally, pivotally secured to a roller support frame 26. Roller support frame 26 is in turn horizontally pivotally secured to rigid element 21a of frame structure 21.

The rollers 24 thus define an arcuate path around which the continuous length of pipe P formed on other portions of the barge may be bent to produce a desired entry angle of the pipe into the water. Those skilled in the art will recognize that a movable track may be employed in place of the rollers 24 and that such track may, if desired, be power driven. A significant feature of the arcuate overbending rollers or track is that it extends from a position overlying the barge deck to a position immediately adjacent to the rear end of the barge through an arc of about 90 degrees. The arcuate extent of the overbending rollers 24 (or track) may be in excess of 90 degrees if the entry angle of the pipe is desired to approach what is essentially a negative angle relative to the direction of the pipe lay. Such positioning of the bent pipe may be desirable in making connections at a fixed or floating structure.

Another significant feature of the overbending structure 20 is that the overbend rollers 24 and the arcuate track 22b describe arcs with a common center axis 29. This allows stinger 30 to rotate about axis 29 and easily achieve a wide range of pipe departure angles. The radius R for the overbend rollers 24, shown on FIG. 2A, can be selected based on the pipe outside diameter, allowable pipe bending strain levels and lay vessel size limitations.

The bending of the continuous pipe P to a desired entry angle into the water is accomplished by a stinger unit 30 which comprises an articulated frame 31 which is disposed in straddling relationship to the arcuate periphery of the overbending frame 21. The forward end of the stinger frame 31 is provided with horizontal pivotal connection pins 36 to a pair of carriages 32 (FIG. 5) which have wheels 33 respectively engaging the arcuate tracks 22b defined by the channels inherently formed on the arcuate I-beams 22. To advance the carriages 32 along the arcuate tracks 22b, a plurality of spaced holes 22c (only two of which are shown) are provided in the web portion 22a of the I-beams 22. A conventional hydraulic advancement mechanism 34 is then mounted at least on the two outer carriages 32 and includes locking pins 34a hydraulically driven into engagement with a selected positioning hole 22c. Cylinders 34b then move the carriages 32 either toward or away from the inserted locking pins 34a. Alternatively, winch controlled cables may be employed to move the carriages 32 along the arcuate tracks 22b.

Figure 5:
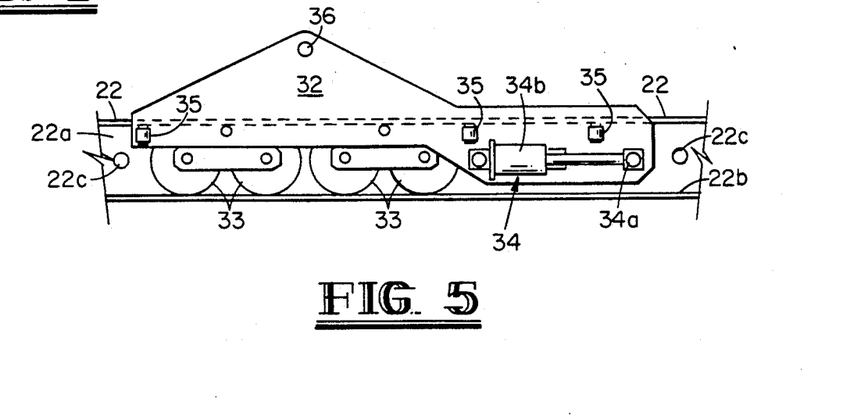
FIG. 5 is an elevational view of one of the carriages employed for mounting the stinger on a track provided in the overbending structure.

If desired, lateral force absorbing rollers 35 may be mounted on vertical axes on the carriages 32 to engage the I-beam flange 22a and provide resistance of the stinger frame 31 to vessel sway and yaw and transverse loads imposed on the stinger.

Thus, the forward end of the stinger assembly 30 may be selectively positioned at any desired arcuate position along the arcuate overbending rollers 24. While not strictly necessary, it is desirable to prevent cyclic movements of the stinger assemblage to support the rear portions of the frame 31 by a cable 37a which is suspended by a cable support 37b which is horizontally shiftable along the support beam 37c of a gantry 37. The length of cable 37a is adjustable by conventional means and hence provides support for the rear portions of the stinger frame 31 at any one of its selected positions along the arcuate tracks 22b.

Figure 6:
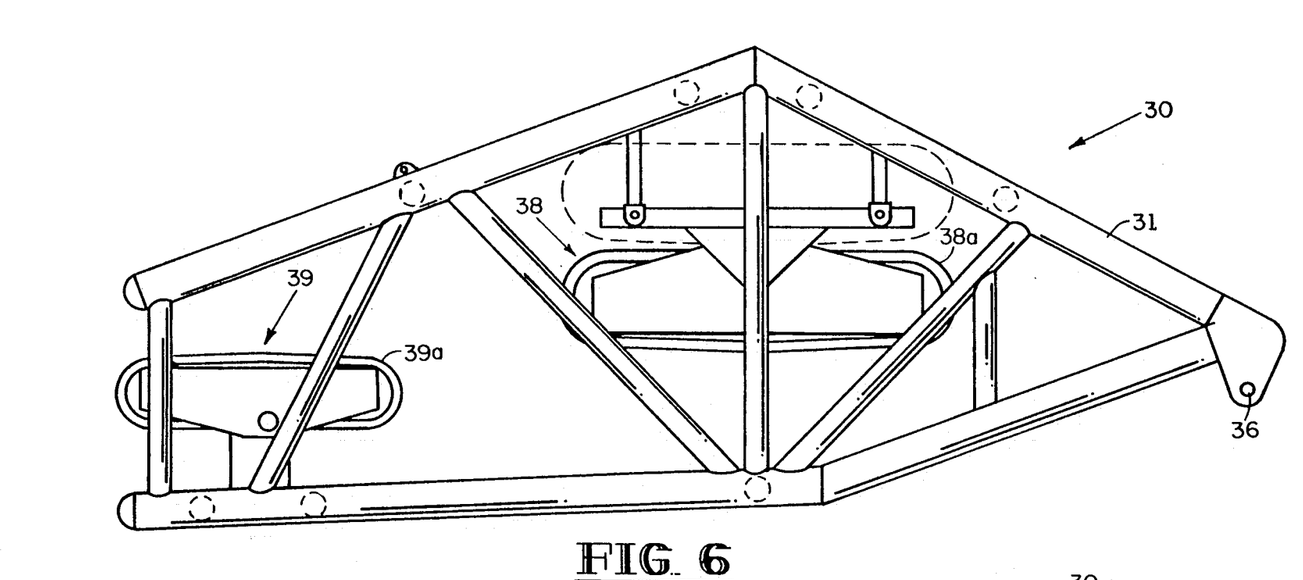
FIG. 6 is an enlarged scale schematic elevational view of the stinger assemblage.
Figure 7:
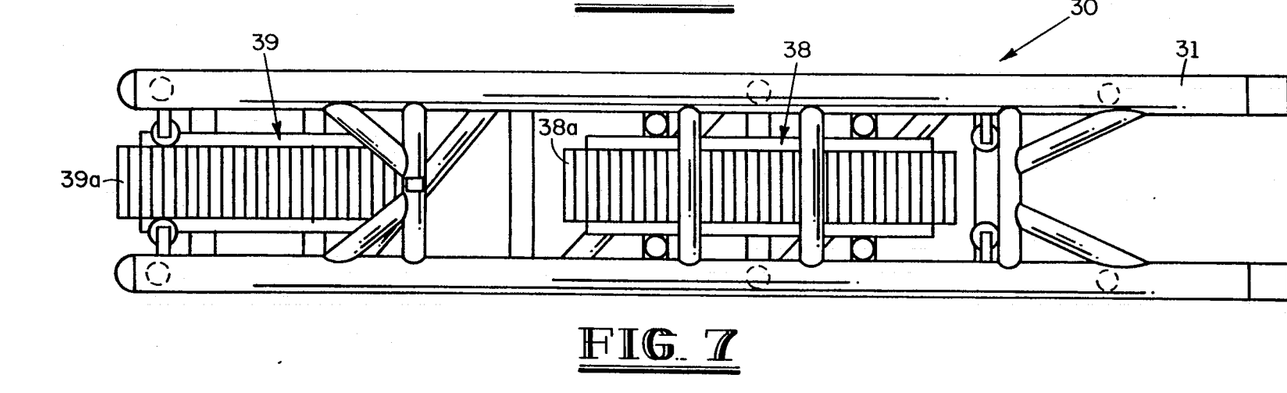
FIG. 7 is a plan view of FIG. 6.

To effect the bending of the continuous pipe P, the stinger frame 31 is provided with a pair of longitudinally spaced, pipe engaging roller means 38 and 39. The forward roller means 38 is vertically adjustable, as indicated in FIG. 6, and, in the preferred modification of this invention, comprises an endless track 38a. Track 38a engages the upper side of pipe P to hold it into engagement with the overbending rollers 24. The rearward pipe engaging roller means 39 also preferably comprises an endless track 39a and engages the lower side of the pipe P. Roller means 38 and 39 impart forces on the pipe P which, in conjunction with overbending rollers 24 create a reverse curvature to the pipe and thereby substantially straighten it following its plastic bending over the overbend rollers 24.

Figure 8:
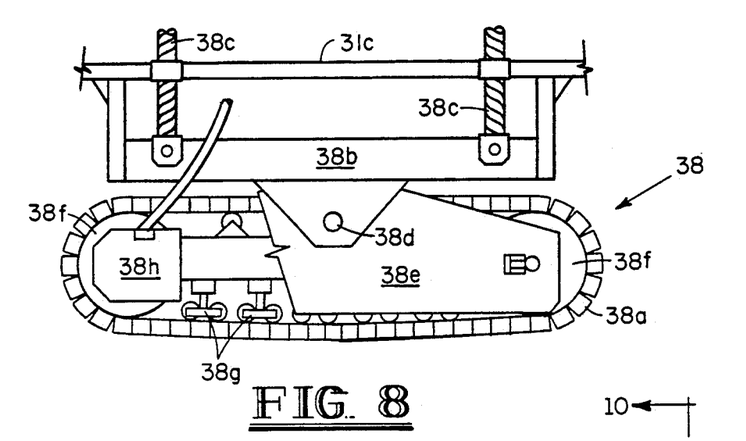
FIG. 8 is an enlarged scale, schematic, side elevational view of the forward pipe bending roller means provided on the stinger frame.

The preferred construction of the forward bending roller means 38, which can also be utilized for the positioning roller 12, is an endless movable track 38a schematically illustrated in FIG. 8. A frame element 38b is supported in depending relationship to a transverse beam 31c by a pair of hydraulically adjustable jack screws 38c. The frame element 38b defines a horizontal pivot 38d to which a sub frame structure 38e is pivotally mounted. Two track supporting pulleys 38f are respectively mounted on each end of the sub frame 38e and support the endless track 38a. Track 38a is preferably constructed with a reasonable degree of slack in its periphery and is maintained in a tightened condition by one or more pneumatically operated biasing elements 38g. In this manner, if rigid protuberances on the continuous pipe P are encountered, such as anodes and buckle arrestors, the endless track 38a will deflect inwardly sufficient to readily pass over such protuberances.

Also, it is preferred that one of the pulleys 38f be provided with a hydraulically operated driving motor 38h which can effect the driving of the track 38a in either direction. When the track is driven in a direction opposing the motion of the continuous pipe P, the power drive obviously contributes to the production of greater tension in the pipe. This feature also provides a significant advantage when recovering the end of a previously laid section of the pipeline for connection to the next section, as will be described in more detail later.

The driving of the track 38a in the same direction as the movement of the continuous pipe P obviously assists in pulling and bending the pipe around the arcuate path provided by the overbending structure 20 and through the stinger 30.

The second or rearmost pipe engaging roller unit 39 may be contructed in a similar fashion to the unit 38, although it is not particularly necessary that this unit incorporate any height adjustment feature. The power drive feature for the track 39a would, however, be of significant advantage in recovery operations.

From the foregoing description, it will be readily apparent to those skilled in the art that the cooperation of the forward roller bending unit 38 with the upper side of the continuous pipe P effects a bending of such pipe along the arcuate path provided by the overbending rollers or track. The extent of such bending is, however, controlled by the arcuate position of the stinger frame 31 which is determined by the selected position of the carriages 32. Thus, as shown in FIG. 2A, if an about 90 degrees position is desired, the carriages 32 would be positioned at the extreme rearward and bottom end of the overbending frame 21. On the other hand, if an entry angle of the pipe into the water of about 30 degrees is desired, the carriages 32 would be positioned as shown in FIg. 2B at a selected intermediate position on the arcuate track 22b defined by the overbending frame 21.

It should be particularly noted that the initial bending of the continuous pipe to conform to the selected water entry angle and the subsequent rebending of the pipe to restore it to a linear configuration is accomplished by stresses in excess of the elastic limit of the pipe. In other words, a plastic deformation of the pipe is produced in both cases. This fact, coupled with a small radius 90 degrees arcuate path of the overbending rollers or track, permits the overbending structure to be located closely adjacent to the rear end and the keel of the barge. The bottom end of the overbending frame structure 21 can be in many cases disposed above the keel line of the barge, thus removing any problems associated with moving the barge into shallow waters for storage purposes.

The pipe bending apparatus embodying this invention is particularly adapted for convenient recovery of the end of a previously laid pipeline from the bottom of the body of water in which the pipeline operation is being conducted. To accomplish such recovery, it is conventional to attach the abandonment/recovery cable, which may be fitted with a buoy marking the end of the pipeline to be recovered, to a suitable winch on the barge 1 and thus pull the free end of the recovered pipeline through and between the rearward pipe engaging roller unit 39 and the forward pipe engaging roller unit 38.

Figure 9:
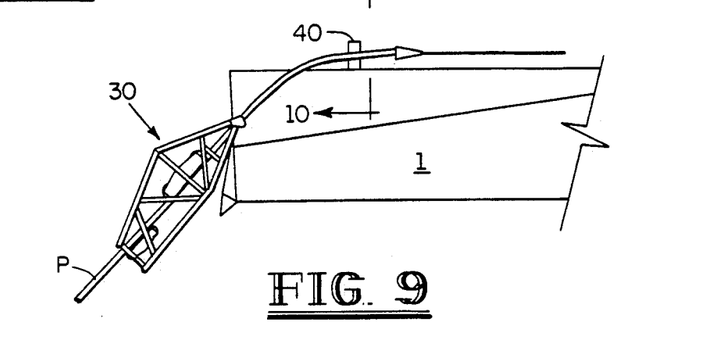
FIG. 9 is a schematic view of the utilization of the recovery clamp with the pipe laying apparatus of this invention.
Figure 10:
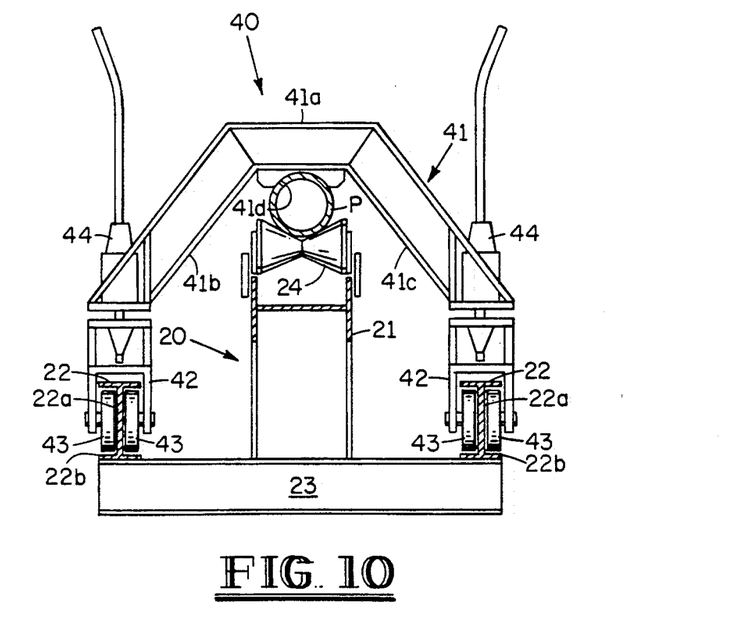
FIG. 10 is a side elevational view of the recovery clamp shown in assembled relationship with the overbending structure.

As shown in FIG. 9, a clamping unit 40 is mounted on the overbending frame structure at a position forwardly of the position of the forward roller unit 38. As best shown in FIG. 10, the clamping unit 40 comprises an inverted U-shaped frame structure 41 having a central bight portion 41a and depending leg portions 41b and 41c. Each of the leg portions 41b and 41c are respectively secured to roller supporting carriage units 42 by a height adjusting unit 44 so that the height of the under surface 41d of the bight portion 41a may be adjusted relative to the roller support frames 42. Each roller carriage unit may be similar to carriages 32, and rotatably mounts rollers 43 which are engagable in the tracks 22b defined by the channels formed on each side of the I-beam 22. In other words, the clamp unit 40 moves along the overbending frame structure 21 by utilizing the same arcuate tracks as are employed for the movement of the stinger carriages 32.

Height adjusting units 44 may be hydraulically or mechanically operated. Thus, the bight portion 41a of clamp 40 may be brought into engagement with the top surface of the pipe being recovered and such free pipe end can be bent through the force applied by the height adjusting units 44 to bring the free pipe end P into engagement with the rollers 24 of the overbending assemblage 20. As the pipe is pulled onto the barge by winching of the abandonment/recovery cable, the clamping unit 40 will be dragged along with the free end of the pipe by virtue of the rollers 43 moving along the arcuate tracks 22b provided by the I-beams 22.

When the recovery operation is completed, and the free pipe end is positioned in horizontal alignment with the pipe being assembled on the barge 1, the recovery clamping unit 40 may be parked at the forward movement of arcuate tracks 22b or moved by the crane 14 conventionally provided on the deck of the barge 1 to move out of the forward end of the I-beam tracks and then lifted and laterally displaced for storage until the next pipe abandonment or recovery operation. The clamping unit 40 is also used to assist in pipeline abandonment operations wherein the pipeline end is lowered to the seabed by essentially the reverse sequence from the previously described pipe recovery operation.

The advantages of the pipe laying apparatus embodying this invention will be readily apparent to those skilled in the art. Pipes of different diameters can be accommodated by the apparatus and readily laid in both shallow and very deep water, even as deep as nine or ten thousand feet, without imparting excessive uncontrolled bending strain to the pipe being laid due to the steep angle of entry of the pipe required for such deep waters. Recovery of any previously laid pipeline end can be rapidly and conveniently accomplished with the clamping apparatus 40, utilizing the same arcuate track as is employed to position the stinger assembly 30.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. Apparatus for laying a continuous metal pipe along the bottom of a body of water from a surface vessel comprising:
    means on said vessel for producing a continuous metal pipe in a substantially linear stress free condition and extending longitudinally toward one end of said vessel;
    means defining a pipe overbending track structure adjacent said one end of said vessel, said overbending structure having an arcuate periphery in a vertical plane extending from a position overlying said vessel and aligned with said continuous metal pipe to said one end of said vessel;
    pipe conveyor means mounted along said arcuate periphery of said overbending structure;
    means on said overbending structure defining an arcuate track parallel to said arcuate periphery of said overbending structure;
    carriage means movable along said arcuate track to any selected one of a plurality of positions;
    a stinger frame straddling said overbending structure and having its forward end horizontally pivotally secured to said carriage means;
    a first roller means carried by said stinger frame and engagable with the upper surface of said continuous pipe to bend said pipe into engagement with a selected portion of said pipe conveyor means determined by the selected position of said carriage means in said arcuate track;
    a second roller means carried by said stinger frame in longitudinally spaced relationship to said first roller means and engagable with the bottom surface of said continuous pipe to reversely bend said pipe into a substantially linear configuration for discharge into the water; and
    means for selectively positioning said carriage means along said arcuate track, thereby determining the entry angle of the continuous pipe into the water.

2. The apparatus of claim 1 further comprising positioning roller means engagable with the upper surface of said continuous metal pipe at a position forwardly of said pipe conveyor means; and
    means for adjusting the height of said positioning roller means to permit passage of protuberances formed on said continuous pipe as well as different size pipe or pipe ends during abandonment/recovery.

3. The apparatus of claim 1 further comprising means for power driving at least one of said first and second roller means on said stinger frame to impart a reverse direction force to said continuous pipe in a pipe recovery operation.

4. The apparatus of claim 1 further comprising means on said stinger frame for adjusting the positions of said first and second roller means relative to the path of said continuous pipe to accommodate different pipe diameters and adjusting to straighten pipe.

5. The apparatus of claim 1, 2, 3, or 4 wherein each of said first and second roller means comprises a frame supporting longitudinally spaced sprockets;
    an endless track formed by pivotally interconnected track shoes contoured to engage the surface of said continuous pipe;

said endless track loosely encircling said sprockets; and fluid pressure means urging a portion of said endless track outwardly for tightening said endless track around said sprockets;

whereby portions of said track engaging protuberances on said continuous pipe can deflect inwardly to accommodate said protuberances.

6. The apparatus of claim 1, 2, 3, or 4 wherein the initial bending of said continuous pipe into engagement with said selected portion of said pipe conveyor means exceeds the elastic limit of said continuous pipe and plastically deforms said continuous pipe, and the reverse bending of said continuous pipe by said second roller means plastically restores said continuous pipe to a linear configuration.

7. The apparatus of claim 1, 2, 3, or 4 wherein the arcuate extent of said arcuate pipe conveyor means is about 90 degrees, thereby permitting selection of an entry angle of said continuous pipe into the water in the range of about 1 degree to substantially about 90 degrees.

8. The apparatus of claim 1, 2, 3, or 4 further comprising:

a stinger support gantry mounted on said one end of the vessel;

a cable support horizontally, longitudinally shiftable on said gantry;

a cable depending from said cable support and secured to said stinger frame; and means for varying the length of said cable intermediate said cable support and said stinger frame to provide vertical support to said stinger frame at any selected position along said arcuate track.

9. The apparatus of claim 1 further comprising:

cable means for pulling the free end of a recovered pipe through said first and second roller means;

a recovery clamp for bending said free end of a recovered pipe into engagement with a portion of said pipe conveyor means comprising:

an inverted U-shaped frame structure having an upper bight portion and depending leg units;

rollers on said depending leg units insertable in and movable along said arcuate track; and means on said bight portion for engaging the upper surface of said free pipe end, whereby said recovery clamp is moved along said arcuate track by said pipe free end to bend said pipe free end to assume a substantially horizontal position.

10. The apparatus of claim 9 further comprising means for adjusting the length of said leg units.

11. Apparatus for laying a continuous metal pipe along the bottom of a body of water from a surface vessel comprising:

means on said vessel for producing a continuous metal pipe in a substantially linear stress free condition and extending longitudinally toward one end of said vessel;

means defining a pipe overbending structure adjacent said one end of said vessel, said overbending structure having an arcuate periphery in a vertical plane extending from a position overlying said vessel and aligned with said continuous metal pipe to the water at said one end of said vessel;

a plurality of horizontal pipe support rollers rotatably mounted in side by side relationship along said arcuate periphery of said overbending structure;

said overbending structure further defining a pair of laterally spaced arcuate tracks perpendicular to the axes of said rollers;

a pair of carriages respectively mounted in said arcuate tracks and movable along said arcuate tracks to any selected one of a plurality of positions;

a stinger frame straddling said overbending structure and having its forward end horizontally pivotally secured to said carriages;

a first roller means carried by said stinger frame and engagable with the upper surface of said continuous pipe to bend said pipe into engagement with a selected plurality of said horizontal rollers determined by the selected position of said carriages in said arcuate tracks;

a second roller means carried by said stinger frame in longitudinally spaced relationship to said first roller means and engagable with the bottom surface of said continuous pipe to reversely bend said pipe into a substantially linear configuration for discharge into the water; and means for selectively positioning said carriages along said arcuate tracks, thereby determining the entry angle of the continuous pipe into the water.

12. The apparatus of claim 11 further comprising positioning roller means engagable with the upper surface of said continuous metal pipe at a position forwardly of said pipe conveyor means; and means for adjusting the height of said positioning roller means to permit passage of protuberances formed on said continuous pipe.

13. The apparatus of claim 11 further comprising means for power driving at least one of said first and second roller means on said stinger frame to impart a reverse direction force to said continuous pipe in a pipe recovery operation.

14. The apparatus of claim 11 further comprising means on said stinger frame for adjusting the positions of one of said first and second roller means relative to the path of said continuous pipe to accommodate different pipe diameters.

15. The apparatus of claim 11, 12, 13, or 14 wherein each of said first and second roller means comprises a frame supporting longitudinally spaced sprockets;

an endless track formed by pivotally interconnected track shoes contoured to engage the surface of said continuous pipe;

said endless track loosely encircling said sprockets; and fluid pressure means urging a portion of said endless track outwardly for tightening said endless track around said sprockets, whereby portions of said track engaging protuberances on said continuous pipe can deflect inwardly to accommodate said protuberances.

16. The apparatus of claim 11, 12, 13, or 14 wherein the initial bending of said continuous pipe into engagement with said selected portion of said pipe conveyor means exceeds the elastic limit of said continuous pipe and plastically deforms said continuous pipe, and the reverse bending of said continuous pipe by said second roller means plastically restores said continuous pipe to a linear configuration.

17. The apparatus of claim 11, 12, 13, or 14 wherein the arcuate extent of said pipe support rollers is about 90 degrees, thereby permitting selection of an entry angle of said continuous pipe into the water in the range of about 1 degree to about 90 degrees.

18. The apparatus of claim 11, 12, 13, or 14 further comprising:
   a stinger support gantry mounted on said one end of the vessel;
   a cable support horizontally, longitudinally shiftable on said gantry;
   a cable depending from said cable support and secured to said stinger frame; and
   means for varying the length of said cable intermediate said cable support and said stinger frame to provide vertical support to said stinger frame at any selected position along said arcuate tracks.

19. The apparatus of claim 11 further comprising:
   cable means for pulling the free end of a recovered pipe through said first and second roller means;
   a recovery clamp for bending the free end of a recovered pipe into engagement with said arcuate array of pipe support rollers comprising:
   an inverted U-shaped frame structure having an upper bight portion and depending leg units having wheels insertable in and movable along said arcuate track; and
   means on said bight portion for engaging the upper surface of said free pipe end, whereby said recovery clamp is moved along said arcuate track by said pipe free end to bend said free pipe end to assume a substantially horizontal position.

20. The apparatus of claim 19 further comprising means for varying the length of said leg units.

* * * * *